United States Patent [19]

Despas

[11] 4,004,777
[45] Jan. 25, 1977

[54] HYDRAULIC TENSIONING DEVICE

[75] Inventor: Bernard Despas, Montherme, France

[73] Assignee: Societe d'Estampage et de Forge Ardennes Champagne-Sefac, Montherme, France

[22] Filed: Dec. 16, 1975

[21] Appl. No.: 641,228

[30] Foreign Application Priority Data

Dec. 20, 1974  France .............................. 74.43545

[52] U.S. Cl. ................................ 254/51; 254/93 R
[51] Int. Cl.² ............................................ B66F 3/24
[58] Field of Search ........................... 254/51, 93 R

[56] References Cited

UNITED STATES PATENTS

| | | | |
|---|---|---|---|
| 2,620,160 | 12/1952 | Ray ................................. | 254/93 R |
| 2,896,583 | 7/1959 | Stixrood ........................... | 254/93 R |
| 3,658,297 | 4/1972 | Banks ................................. | 254/51 |
| 3,891,187 | 6/1975 | Bearden ........................... | 254/93 R |

*Primary Examiner*—James L. Jones, Jr.
*Assistant Examiner*—Robert C. Watson
*Attorney, Agent, or Firm*—Eric P. Schellin

[57] ABSTRACT

An hydraulic tensioning device wherein a shaft to which a cable may be attached for tensioning is coupled for movement to an hydraulically operated jack. The shaft is mounted for axial movement in a casing its axial and angular movement being controlled by a locking ring surrounding the shaft and angularly movable in the casing by actuating means which can be operated externally of the casing.

11 Claims, 10 Drawing Figures

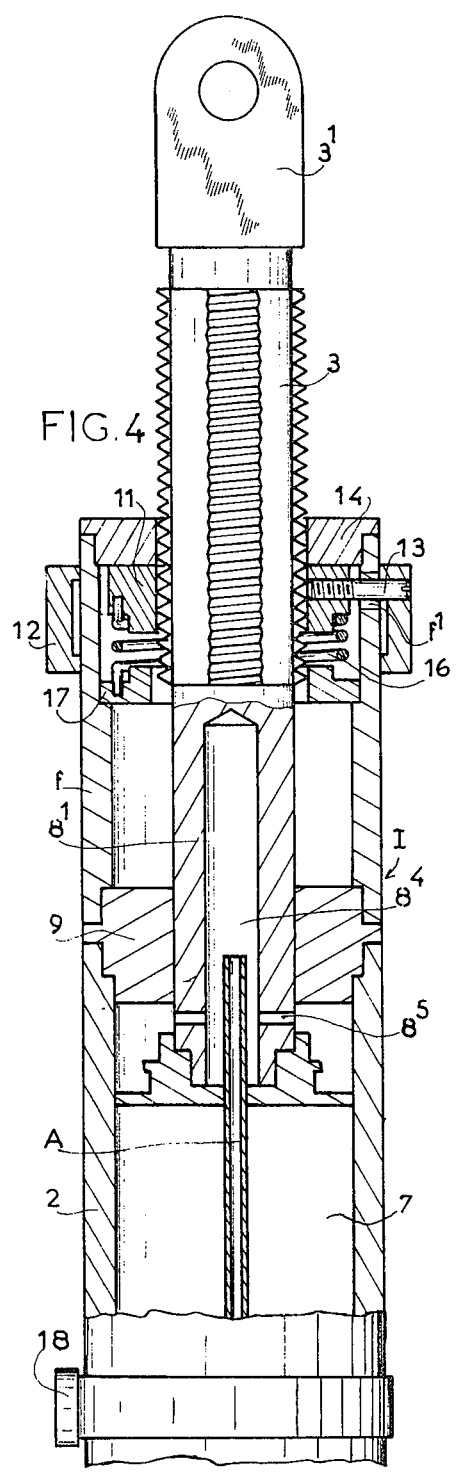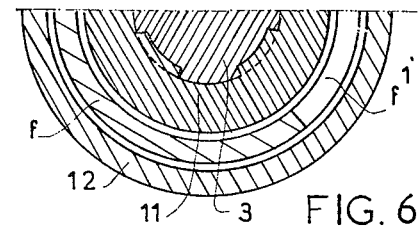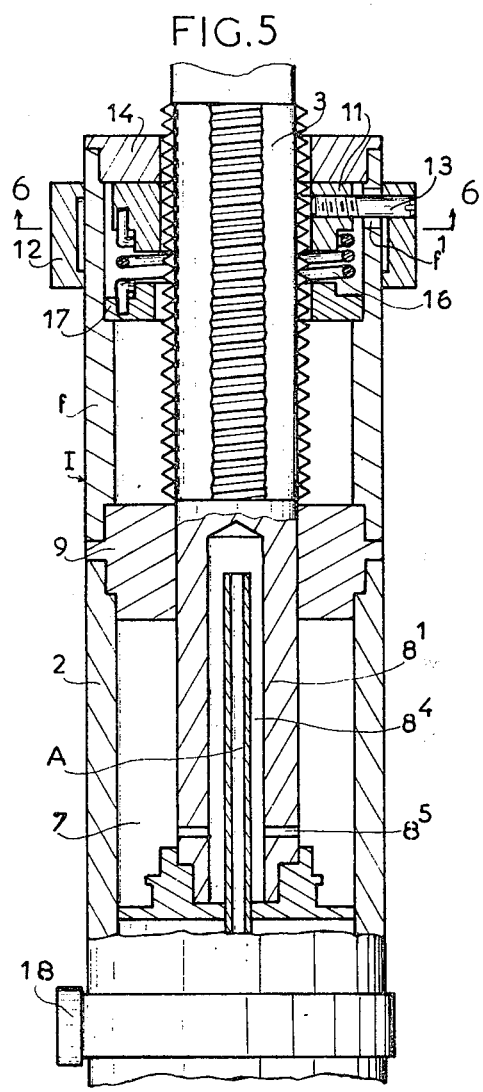

HYDRAULIC TENSIONING DEVICE

The present invention relates to an hydraulic tensioning device, more particularly to an hydraulic tensioning device for tensioning shrouds.

The invention is applicable particularly to the maintenance, hoisting, raising and hauling of vessels or other floating craft.

Devices for imparting high tension to cables are well known. Such devices are often employed for tensioning mast shrouds of vessels and sailing vessels in particular, but present numerous and notorious disadvantages.

In fact, known shrowd stretchers are generally located in the hull of the vessel, and thus compel the operator to carry out a relatively delicate manoeuvre, the more so as it is difficult for him alone to determine whether the tension of the cable is sufficient or not. Hence, the necessity for a second person to verify from the bridge of the vessel that the shroud tension is sufficient.

It will thus be seen from these arrangements that the tension of cables or shrouds is difficult to control.

Moreover, such tensioning or stretching devices are cumbersome heavy and costly.

It is therefore an object of the invention to provide an hydraulic tensioning device for obviating these inconveniences.

According to the invention therefore there is provided an hydraulic tensioning device comprising a casing, an hydraulic pump and an operatively associated jack, a shaft mounted in the casing for slidable guidance in a fixed angular position and being coupled to said jack, said shaft having longitudinally extending notches in its peripheral surface defining raised intermediate portions which are provided with transverse grooves, locking means for locking the shaft in a controlled axial position said locking means comprising a locking ring having a bore which is provided with grooves and notches corresponding with the grooves and notches on said shaft said locking ring being operatively mounted to surround said shaft, actuating means cooperating with said locking ring for moving the ring angularly and externally of said casing so as to mesh the grooves in the bore of the locking ring with the corresponding grooves on said shaft to thereby lock the shaft in an adjusted axial position and to disengage the grooves on the shaft and the ring and permit axial movement of the shaft, said locking ring being keyed to said casing.

A further feature of the invention is that the catches formed on the locking ring and the shaft are formed by threading, so that when the locking ring is axially moved its threads engages that of the grooved shaft.

The invention will now be described by way of example with reference to the accompanying drawings wherein:

FIG. 4 is a diagrammatic front view in partial section with the grooved and notched shaft lying outside the casing of the device corresponding to a non-tensioned position of the cable or shroud;

FIG. 5 is a diagrammatic view according to FIG. 4, showing the grooved and notched shaft in a position "withdrawn" for tensioning the cable or shroud;

FIG. 6 is a "half-view" in section along the line 6—6 in FIG. 5;

Figure 1:
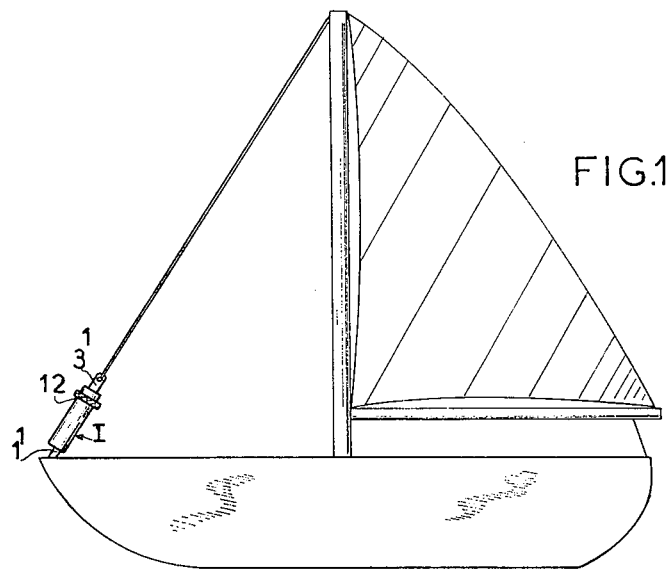
FIG. 1 shows in front elevation an hydraulic tensioning device according to the invention mounted in a sailing boat for tensioning the shroud.
Figure 10:
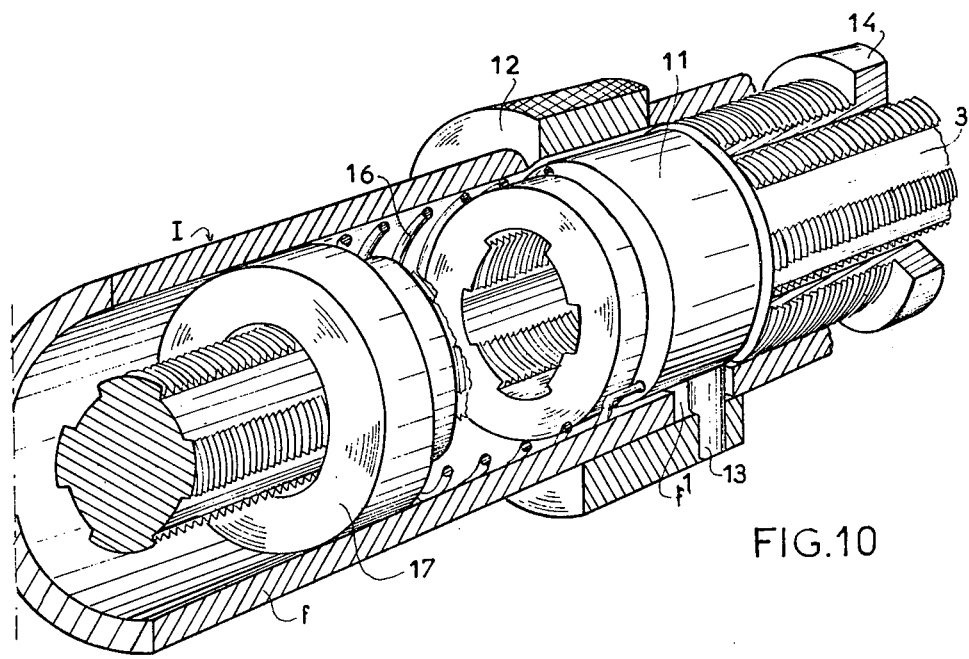
FIG. 10 illustrates in perspective and in partial section the means for locking the grooved and notched shaft.
Figure 2:
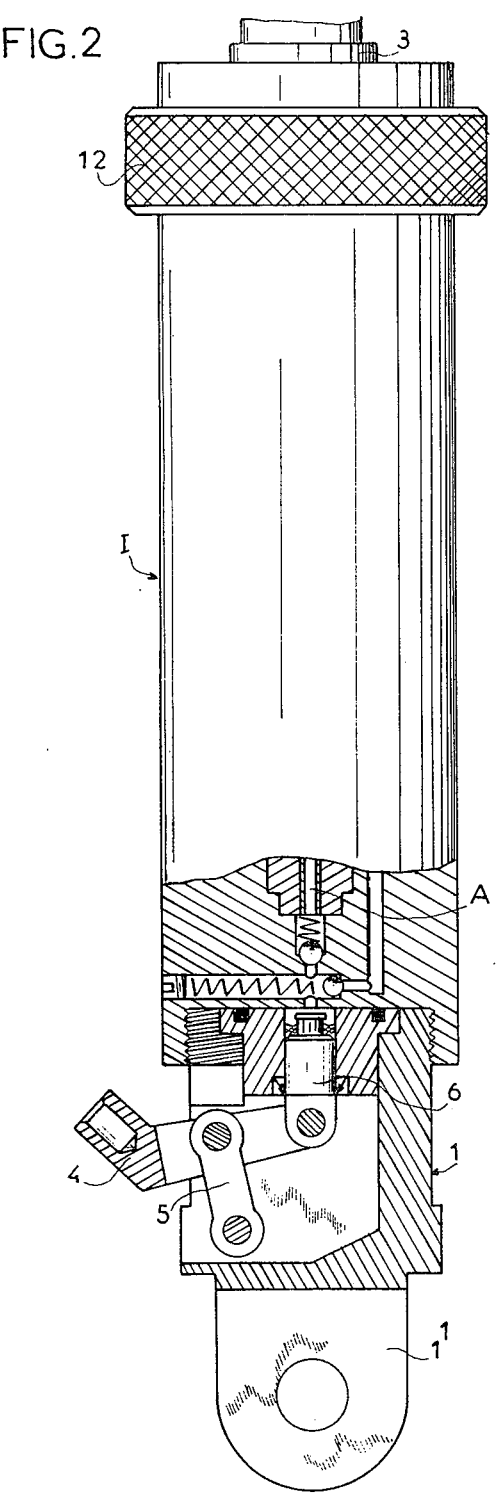
FIG. 2 shows in partial cross-section an hydraulic tensioning device according to the invention.
Figure 3:
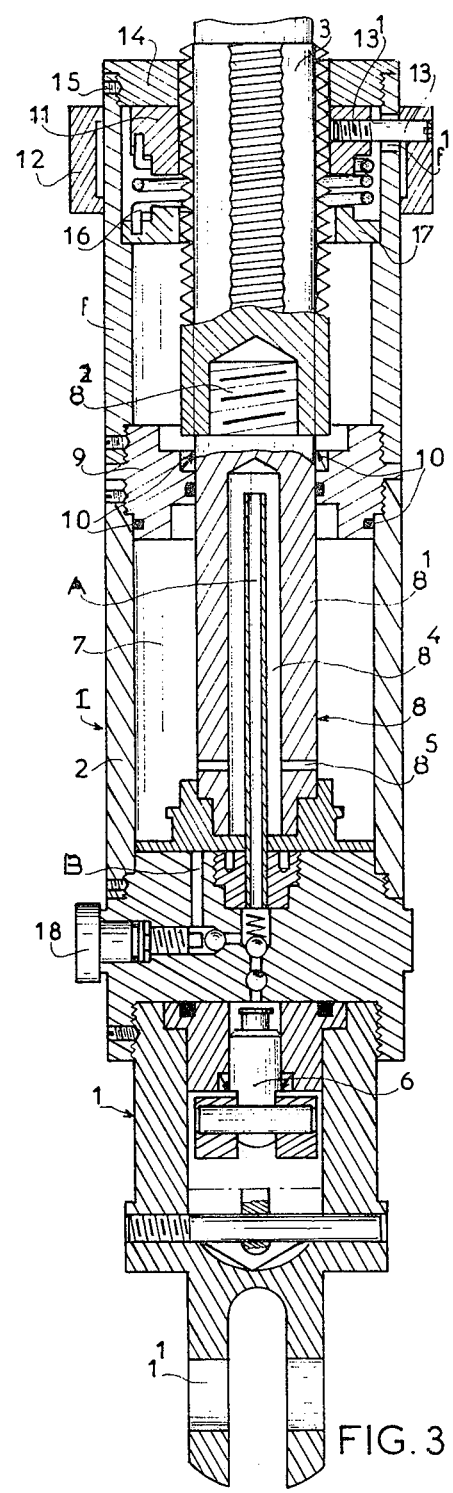
FIG. 3 is a front view in lateral section of the device of FIG. 2.
Figure 9:
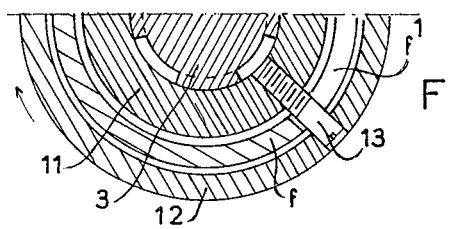
FIG. 9 is a "half-view" in section along the line 9—9 in FIG. 7.
Figure 7:
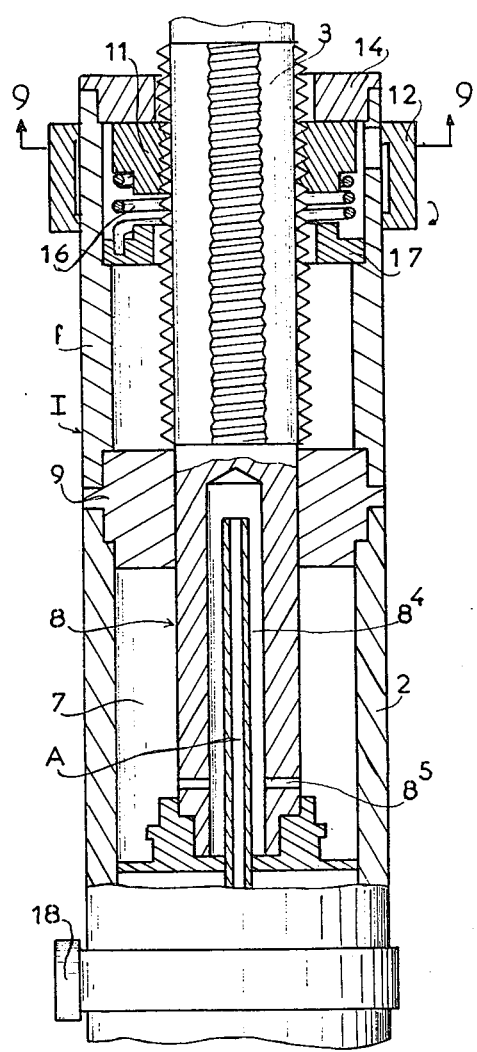
FIG. 7 is a diagrammatical view according to FIG. 5, showing the grooved and notched shaft locked after the ring has been rotated for cancelling the hydraulic tension.

With reference to FIG. 3 an hydraulic tensioning device is shown consisting of a casing I having at one end a pump 1 and a jack 2 having a rod 8' integral with a groove and notched shaft 3, co-acting with a locking mechanism including a locking mechanism 11. The body I is formed by assembling a connecting box 9 the jack 2 and a tubular sleeve $f$, having at its end the locking mechanism.

The pump 1 comprises a lever or handling means 4, which enables by means of one or more knuckle-jointed connecting rods 5 the piston 6 to be rectilinearly moved up and down for admitting fluid under pressure to the chamber 7 of the jack.

The rod $8^1$ of a piston 8 of the jack 2 is united via threading $8^2$, to the grooved and notched shaft 3. The piston 8, and consequently the shaft 3, is slidingly guided, having a fixed angular position, by means of the bore $9^1$ of the connecting box 9.

It will be observed that the box 9 is provided on its periphery and along its bore with sealing joints to prevent any of the fluid, stored in the chamber 7 of the jack, penetrating the tubular sleeve $f$ of the locking mechanism.

It will further be seen that the rod $8^1$ of the piston 8 and the grooved and notched shaft 3 may be made in one piece.

Figure 8:
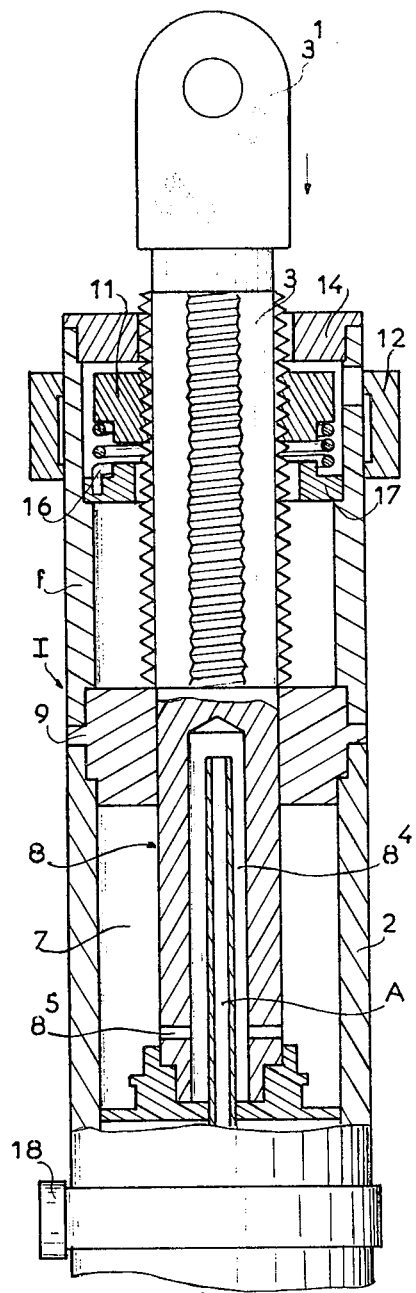
FIG. 8 shows diagrammatically the unlocking of the grooved and notched shaft according to FIG. 7.

As is shown more particularly in FIG. 8, the shaft 3 has four longitudinal grooved portions in a preferred but non-restrictive embodiment, by threading, preferably trapezoidal.

In the present case it is enough to take a threaded shaft and form in it in any known way the desired number of grooves.

The shaft 3 co-acts with the locking mechanism in the controlled axial position of the latter.

This mechanism comprises a locking ring 11, whose bore is channelled and notched in a way corresponding to the shaft 3 passing therethrough. As shown in FIG. 8, the catches formed on the male parts of the channels in the bore of the ring 11 are threads of the same pitch as those of the grooved shaft 3.

The ring 11 co-operates with means for moving it angularly from outside the body and the sleeve $f$ in particular. The ring 11 is entrained by a milled ring 12. The milled ring 12 is mounted in a freely sliding fit over the end of the tubular body I, and has to the right of its median axis a rod 13, whose threaded end $13^1$ is screwed into a tapped hole in the ring 11 with a view to moving it angularly. On the periphery of the body I there is provided an oblong opening $f^1$ for the engagement of the rod 13 and its angular movement when the milled ring 12 is rotated by hand.

The opening $f^1$ also allows the assembly of the milled ring 12 and the channelled and notched ring 11 to be moved axially, as is described further hereinafter.

The angular displacement of the ring 11 enables to bring as desired the valleys and crests of the screwthreads, into a position permitting axial movement of the shaft 3 (FIGS. 4 and 5), or else into a position engaging the assembly of the notches or threads on the upstanding parts of the channels of the ring 11 and the shaft 3 so as to effect the locking of the shaft 3 in the adjusted axial position.

According to a feature of the invention the ring 11 abuts with its rear part a member that is integral with the end of the casing I, and more particularly a shouldered threaded plug 14 which is screwed into the casing I. Grup screws 15 are provided to exclude any risk of the plug 14 becoming unblocked.

It will be seen from FIGS. 4, 5, 6 and 7 that the end of the grooved shaft 3 which lies outside the body is adapted to co-act with a cable, shroud or other connecting means. For instance, the end of the shaft 3 may have an annular hollow $3^1$ in which the cable is fixed.

In another feature of the invention unlocking of the shaft 3 is effected automatically by a spring 16. One end of this spring 16, acting by angular torsion, is fixed in position by a smooth shouldered ring 17, while the other end is engaged in the ring 11.

It is to be observed that the ring 17 is forced into the inner passage of the casing I and abuts with a shoulder, the bore of this ring 17 enabling the shaft 3 to slide freely within it.

The mode of operation of the hydraulic tensioning device as specified above, is as follows.

When the handling lever 4 of the pump 1 is actuated the piston 6 thereof admits fluid under pressure ahead of the piston 8 of the jack 2, which thus pulls inside (FIGS. 4 and 5) the shaft 3 to tension a cable or shroud attached thereto.

It is to be borne in mind that the piston 8 of the jack 2 operates by traction. In fact, the rod $8^1$ of the latter has an internal axial channel $8^4$ for the flow of fluid supplied by the pump piston at A. Thus the fluid comes up against the head of the piston 8 in the chamber 7 through the passage $8^5$, formed close to the latter and passing through the rod $8^1$ of the piston 8.

Thus, once the desired tension of the cable has been achieved, the milled ring 12 is turned by hand, so entailing the angular movement of the ring 11 to bring the notches or threads of the latter into correspondence with those of the threaded shaft 3. This results in the locking in position of the shaft 3 (FIG. 6). The discharge tap 18 of the pump 1 is then actuated to cancel the hydraulic tension.

At this moment the tensioning device behaves as a simple mechanical tractive bolt. It may be observed that, although the shaft 3 and the ring 11 each has four channels, it is enough to turn the ring 11 by means of the milled ring 12 through one-eighth of a revolution to bring the threads or notches into engagement.

The action of turning the channelled ring 11 imparts an angular torsion to the spring 16, the latter being fixed in this case to a fixed "point" of the ring 17 at one of its ends, as described above.

It must be stressed that when hydraulic tension is cancelled this reduces the pressure in the chamber 7 of the jack 2. The cable or shroud attached at $3^1$ will, therefore, exert a tractive force on the channelled shaft 3, the effect of which is to apply the ring 11 against the plug 14, screwed into the end of the casing I.

Unlocking (FIG. 7) takes place automatically. After a further pumping action on the handling lever 4, the fluid stored in the chamber 7 lightly repells the piston 8 of the jack 2, thus exerting a tractive force on the channelled shaft 3. This results in "detaching" the channelled ring 11 from the plug 14, and so the angular relief of the spring 16, which thus causes the ring 11 to turn automatically in the sense opposite to the foregoing, axially releasing the channelled shaft 3. The upstanding parts of the channels of the ring 11 coact with the hollow parts of the channels of the shaft 3 (FIG. 3).

As pumping continues, the fluid through the passage B pushes the piston 8 of the jack so the channelled and notched shaft into its initial position, i.e. when the cable is not tensed (FIG. 4). It is now enough to actuate the delivery tap 18 belonging to the pump 1 in the sense opposite to the foregoing to suppress the inflow of fluid behind the head of the piston 8.

It will also be seen, more particularly from FIG. 3, that the rear end of the pump 1 forms a fork $1^1$ for hinging the tensioning device, so designed, to a fixed point, for instance, on the bridge of a vessel when it is intended to stretch one or more shrouds.

It is quite clear that this hydraulic tensioning device is applicable not only to tensioning mast shrouds of sailing vessels, but to tensioning cables or ropes in general.

Moreover, the tensioning device may be made of any size and any material, and have a different hydraulic feed circuit, on the sole condition that it shall perform the same functions as that mentioned in the description.

The advantages are clearly apparent from the description, but the following may be particularly underlined:

It is highly fluid-tight,
Passive safety through the rotation of the channelled and notched ring should defective pressure be applied,
Low weight,
Attractive appearance,
Ease of operation.

I claim:

1. An hydraulic tensioning device comprising a casing, an hydraulic pump and an operatively associated jack, a shaft mounted in the casing for slidable guidance in a fixed angular position and being coupled to said jack, said shaft having longitudinally extending notches in its peripheral surface defining raised intermediate portions which are provided with transverse grooves, locking means for locking the shaft in a controlled axial position said locking means comprising a locking ring having a bore which is provided with grooves and notches corresponding with the grooves and notches on said shaft said locking ring being operatively mounted to surround said shaft, actuating means cooperating with said locking ring for moving the ring angularly and externally of said casing so as to mesh the grooves in the bore of the locking ring with the corresponding grooves on said shaft to thereby lock the shaft in an adjusted axial position and to disengage the grooves on the shaft and the ring and permit axial movement of the shaft, said locking ring being keyed to said casing.

2. A device according to claim 1, wherein said grooves in the bore of said locking ring and on said shaft have the form of threads whereby subsequent to an angular displacement of said ring the grooves on the ring may engage the grooves on said shaft.

3. A device according to claim 2 wherein said locking ring is freely mounted inside said casing, said locking ring abutting a closure plug screwed into the leading end of the casing.

4. A device according to claim 3, wherein said actuating means comprises a milled ring mounted for slidable movement peripherally of said casing, said milled ring being manually operable and provided with a rod screwable into said locking ring for moving said locking ring angularly.

5. A device according to claim 4, wherein an oblong aperture is provided on the periphery of said casing for accommodating said rod and permitting said angular and axial movement of the locking ring.

6. A device according to claim 4, wherein a spring is torsionally positioned via one end thereof in a shoulder portion forcibly enclosed inside said casing and having a bore allowing free axial movement of said shaft therethrough, the other end of said spring being engaged with said locking ring.

7. A device according to claim 6, wherein under the action of said hydraulic pump said shaft is pulled into said casing and held by said locking means for tensioning a cable attached to the shaft.

8. A device according to claim 1, wherein the piston of said jack operates by traction, and has an interior axial passageway for the flow of hydraulic fluid supplied by the pump, said fluid coming to face the head of the jack piston through passages provided vicinal to the latter and leading through the piston rod.

9. A device according to claim 1, wherein said spring, fixed by one of its ends to said fixed shoulder forcibly enclosed in said casing becomes angularly twisted when said locking ring is turned.

10. A device according to claim 9, wherein a fork portion is attached to the rear end of the pump for hinging said tensioning device to a fixed point.

11. A device according to claim 10, wherein the leading end of said shaft projects from said casing and has an annular hollow portion for attaching to a cable or shroud.

* * * * *